United States Patent
Harris et al.

(10) Patent No.: US 12,043,569 B2
(45) Date of Patent: Jul. 23, 2024

(54) COMPENSATED MOLDS FOR MANUFACTURING GLASS-BASED ARTICLES HAVING NON-UNIFORM THICKNESSES

(71) Applicant: CORNING INCORPORATED, Corning, NY (US)

(72) Inventors: Jason Thomas Harris, Horseheads, NY (US); Jeffrey Todd Kohli, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 493 days.

(21) Appl. No.: 17/433,790

(22) PCT Filed: Feb. 20, 2020

(86) PCT No.: PCT/US2020/019030
§ 371 (c)(1),
(2) Date: Aug. 25, 2021

(87) PCT Pub. No.: WO2020/176327
PCT Pub. Date: Sep. 3, 2020

(65) Prior Publication Data
US 2022/0135472 A1    May 5, 2022

Related U.S. Application Data

(60) Provisional application No. 62/811,775, filed on Feb. 28, 2019.

(51) Int. Cl.
*C03C 21/00*    (2006.01)
*C03B 23/023*    (2006.01)

(52) U.S. Cl.
CPC .......... *C03C 21/002* (2013.01); *C03B 23/023* (2013.01)

(58) Field of Classification Search
CPC .............................. C03C 23/03; C03C 21/002
See application file for complete search history.

(56) References Cited

U.S. PATENT DOCUMENTS

| 4,059,428 A | 11/1977 | Andrews |
| 5,192,353 A | 3/1993 | Trentelman |
| (Continued) | | |

FOREIGN PATENT DOCUMENTS

| CN | 105358500 A | 2/2016 |
| WO | 2012/125857 A1 | 9/2012 |
| (Continued) | | |

OTHER PUBLICATIONS

Chinese Patent Application No. 202080017677.X, Office Action, dated Dec. 15, 2022, 4 pages Chinese Patent Office.

(Continued)

*Primary Examiner* — Alison L Hindenlang
*Assistant Examiner* — Steven S Lee
(74) *Attorney, Agent, or Firm* — Travis B. Gasa; Kapil Banakar

(57) ABSTRACT

Methods for compensating for warp typically exhibited by glass-based articles having non-uniform thicknesses as a result of ion exchange strengthening are provided. The methods include producing a molding surface of a mold based on a measurement of warp obtained by a specified ion exchange strengthening of a glass-based substrate of non-uniform thickness, such that the molding surface offsets the warp. Glass-based substrates resulting from the mold can then be exposed to the specified ion exchange strengthening and form glass-based articles that are substantially free of warp.

20 Claims, 9 Drawing Sheets

(56) References Cited

U.S. PATENT DOCUMENTS

| | | |
|---|---|---|
| 8,312,739 B2 | 11/2012 | Lee et al. |
| 8,561,429 B2 | 10/2013 | Allan et al. |
| 8,854,623 B2 | 10/2014 | Fontaine et al. |
| 9,292,634 B2 | 3/2016 | Ahmed et al. |
| 9,779,190 B2 | 10/2017 | Ahmed et al. |
| 10,633,279 B2 | 4/2020 | Gross et al. |
| 10,906,834 B2 | 2/2021 | Gross et al. |
| 2011/0129648 A1* | 6/2011 | Gu ................. C03C 21/002 65/106 |
| 2012/0297828 A1* | 11/2012 | Bailey .............. C03B 23/0258 165/172 |
| 2013/0125588 A1* | 5/2013 | Kladias ............... C03B 29/08 65/106 |
| 2014/0234581 A1 | 8/2014 | Immerman et al. |
| 2014/0331716 A1* | 11/2014 | Ahmed ................. H05K 5/03 703/1 |
| 2014/0335322 A1* | 11/2014 | Luo .................. C03B 23/0307 65/273 |
| 2015/0274585 A1 | 10/2015 | Rogers et al. |
| 2016/0162615 A1* | 6/2016 | Ahmed ................. C03C 21/002 703/2 |
| 2017/0334769 A1* | 11/2017 | Luzzato .............. C03C 23/0025 |
| 2018/0251400 A1 | 9/2018 | Bookbinder et al. |
| 2019/0023611 A1* | 1/2019 | Luzzato ................ C03C 21/002 |
| 2019/0106353 A1 | 4/2019 | Rai et al. |
| 2020/0017406 A1* | 1/2020 | Wilson ................... C03C 21/00 |

FOREIGN PATENT DOCUMENTS

| | | | |
|---|---|---|---|
| WO | WO-2012125857 A1 * | 9/2012 | ............. B32B 17/06 |
| WO | 2018/102332 A1 | 6/2018 | |
| WO | WO-2018102332 A1 * | 6/2018 | ............. C03C 15/00 |

OTHER PUBLICATIONS

International Search Report and Written Opinion of the International Searching Authority; PCT/US2020/019030 Mailed on Jun. 29, 2020, 11 pages; European Patent Office.

* cited by examiner

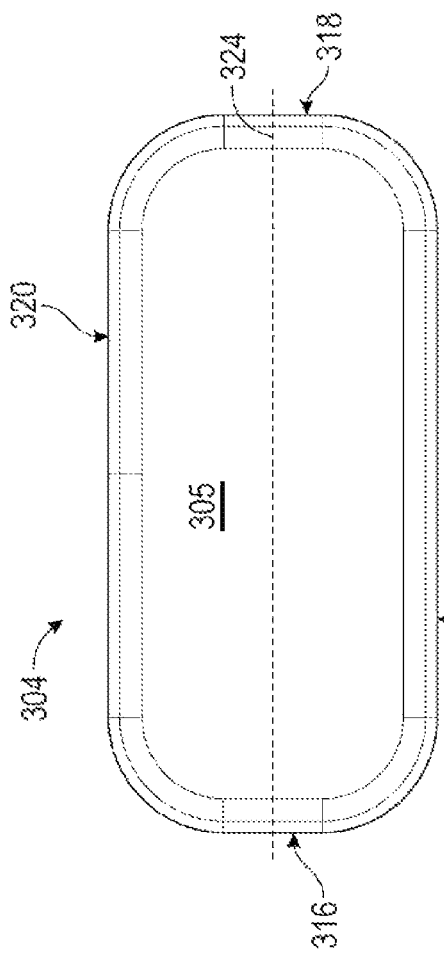
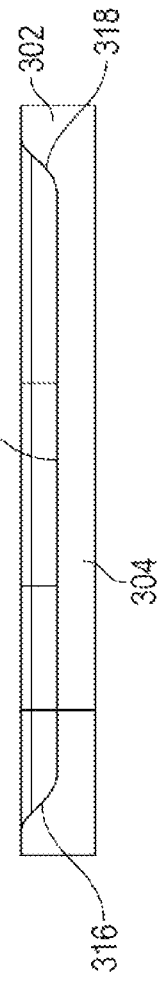
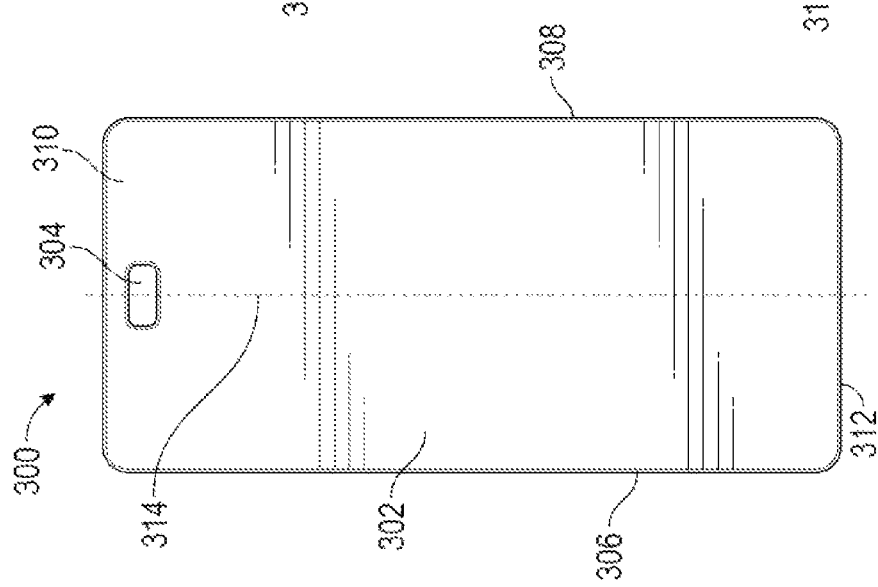

COMPENSATED MOLDS FOR MANUFACTURING GLASS-BASED ARTICLES HAVING NON-UNIFORM THICKNESSES

This application is a national stage entry of International Patent Application Serial No. PCT/US2020/019030 filed on Feb. 20, 2020, which claims the benefit of priority of U.S. Provisional Application Ser. No. 62/811,775 filed on Feb. 28, 2019, the content of each are relied upon and incorporated herein by reference in its their entirety.

BACKGROUND

Field

The present specification generally relates to glass-based articles having non-uniform thicknesses for electronic devices, such as mobile or handheld electronic devices. More particularly, the specification relates to 2.5-dimensional glass-based articles that have been ion exchange strengthened and to the molds used to make such glass-based articles.

Technical Background

The mobile nature of portable devices, such as smart phones, tablets, portable media players, personal computers, and cameras, makes these devices particularly vulnerable to accidental dropping on hard surfaces, such as the ground. These devices typically incorporate cover glasses, which may become damaged upon impact with hard surfaces. In many of these devices, the cover glasses function as display covers, and may incorporate touch functionality, such that use of the devices is negatively impacted when the cover glasses are damaged.

There are two major failure modes of cover glass when the associated portable device is dropped on a hard surface. One of the modes is flexure failure, which is caused by bending of the glass when the device is subjected to dynamic load from impact with the hard surface. The other mode is sharp contact failure, which is caused by introduction of damage to the glass surface. Impact of the glass with rough hard surfaces, such as asphalt, granite, etc., can result in sharp indentations in the glass surface. These indentations become failure sites in the glass surface from which cracks may develop and propagate.

Further, the cover glass shapes and geometries can be non-planar, containing some out-of-plane (three-dimensional) shapes, or they may have non-uniform thicknesses (e.g., machined 2.5D edges), which pose challenges on the forming and reliability of the parts. The machined 2.5D edge is machined to a taper, with the top surface (customer-facing) being smaller than the back face. Ion exchange strengthening is a process where smaller alkali ions are replaced by larger ones supplied by a molten salt bath (sodium for lithium, and/or sodium for potassium). The process increases the volume on the surface, holding it in compression because of the stress balance with the core. Because of the asymmetry through the thickness on the edge of the cover glass and due to the fact that ion exchange results in a volume change on the edges, initially flat 2.5D parts can undergo warp due to the ion exchange.

It has been a continuous effort for glass makers and handheld device manufacturers to improve the resistance of handheld devices to failure. It is also desirable that portable devices be as thin as possible. Accordingly, in addition to strength, it is also desired that glasses to be used as cover glass in portable devices be made as thin as possible. Thus, in addition to increasing the strength of the cover glass, it is also desirable for the glass to have mechanical characteristics that allow it to be formed by processes that are capable of making thin glass articles, such as thin glass sheets.

Accordingly, a need exists for glasses that can be strengthened, such as by ion exchange, and be molded within the customer's specifications for flatness after the ion exchange strengthening process.

SUMMARY

Aspects of the disclosure pertain to glass-based articles and methods for their manufacture and use.

In an embodiment, a method of making a glass-based article having a non-uniform thickness comprises: (I) obtaining a glass-based substrate; (II) processing the glass-based substrate to form a non-uniform thickness glass-based substrate comprising a body portion having a body thickness ($t_b$) and a secondary portion having a secondary thickness ($t_2$); (III) placing the non-uniform thickness glass-based substrate on a molding surface of a mold; (IV) producing a molded, unstrengthened glass-based substrate from the mold of step (III); and (V) exposing the molded, unstrengthened glass-based substrate produced in step (IV) to ion exchange strengthening to form the glass-based article having the non-uniform thickness. The molding surface of the mold of step (III) is produced based on a measurement of warp obtained by prior performance of the ion exchange strengthening of step (V) on a non-uniform glass-based substrate having the same composition and dimensions as the non-uniform thickness glass-based substrate of (II) such that the molding surface of the mold of step (III) offsets the warp.

In an embodiment, a method of making a glass-based article, the glass-based article having a target 2.5-dimensional shape which comprises a body portion having a body thickness ($t_b$) and a perimeter portion which: (i) borders at least part of the planar central portion; (ii) has a thickness that decreases from the body portion to a perimeter edge having a thickness ($t_2$), wherein $t_b > t_2$; and (iii) is within the plane of the body portion to provide the glass-based article with 2.5-dimensionality, the method comprises: (I) obtaining a glass-based substrate; (II) processing an edge of the glass-based substrate to form a tapered edge profile glass-based substrate; (III) placing the tapered edge profile glass-based substrate on a molding surface of a mold; (IV) producing a molded, unstrengthened glass-based substrate from the mold of step (III); and (V) exposing the molded, unstrengthened glass-based substrate produced in step (IV) to ion exchange strengthening to form the glass-based article. The molding surface of the mold of step (III) is produced based on a measurement of warp obtained by prior performance of the ion exchange strengthening of step (V) on a non-uniform glass-based substrate having the same composition and dimensions as the tapered edge profile glass-based substrate of (II) such that the molding surface of the mold of step (III) offsets the warp.

According to aspect (1), a method of making a glass-based article having a non-uniform thickness is provided. The method comprises: (I) processing a glass-based substrate to form a non-uniform thickness glass-based substrate comprising a body portion having a body thickness ($t_b$) and a secondary portion having a secondary thickness ($t_2$); (II) placing the non-uniform thickness glass-based substrate on a molding surface of a mold; (III) producing a molded, unstrengthened glass-based substrate from the mold of step (II); and (IV) ion exchange strengthening the molded, unstrengthened glass-based substrate produced in step (III) to form the glass-based article having the non-uniform thickness. the molding surface of the mold of step (II) is produced based on a measurement of warp obtained by prior performance of the ion exchange strengthening of step (IV) on a non-uniform glass-based substrate having the same composition and dimensions as the non-uniform thickness glass-based substrate of (I) such that the molding surface of the mold of step (II) offsets the ion exchange strengthening induced warp.

According to aspect (2), the method of aspect (1) is provided, wherein the measurement of warp is conducted empirically.

According to aspect (3), the method of aspect (1) is provided, wherein the measurement of warp is conducted by modeling.

According to aspect (4), the method of any one of aspects (1) to (3) is provided, wherein the secondary portion borders the body portion and has a tapered profile, the secondary thickness ($t_2$) being located at a perimeter edge of the glass-based substrate and the secondary thickness ($t_2$) is less than the body thickness ($t_b$) such that the glass-based article has a 2.5-dimensional shape.

According to aspect (5), the method of any one of aspects (1) to (4) is provided, wherein the secondary portion is off-set from one or more perimeter edges of the glass-based substrate, and the secondary thickness ($t_2$) is less than the body thickness ($t_b$).

According to aspect (6), a method of making a glass-based article is provided. The glass-based article having a target 2.5-dimensional shape which comprises a body portion having a body thickness ($t_b$) and a perimeter portion which: (i) borders at least part of the planar central portion; (ii) has a thickness that decreases from the body portion to a perimeter edge having a thickness ($t_2$), wherein $t_b > t_2$; and (iii) is within the plane of the body portion to provide the glass-based article with 2.5-dimensionality. The method comprises: (I) processing an edge of a glass-based substrate to form a tapered edge profile glass-based substrate; (II) placing the tapered edge profile glass-based substrate on a molding surface of a mold; (III) producing a molded, unstrengthened glass-based substrate from the mold of step (II); and (IV) ion exchange strengthening the molded, unstrengthened glass-based substrate produced in step (III) to form the glass-based article. The molding surface of the mold of step (II) is produced based on a measurement of warp obtained by prior performance of the ion exchange strengthening of step (IV) on a non-uniform glass-based substrate having the same composition and dimensions as the tapered edge profile glass-based substrate of (I) such that the molding surface of the mold of step (II) offsets the ion exchange strengthening induced warp.

According to aspect (7), the method of aspect (6) is provided, wherein the measurement of warp is conducted empirically.

According to aspect (8), the method of aspect (6) is provided, wherein the measurement of warp is conducted by modeling.

According to aspect (9), the method of any one of aspects (6) to (8) is provided, wherein the processing of the edge of the glass-based substrate to form the tapered edge profile glass-based substrate comprises a non-thermal process.

According to aspect (10), the method of aspect (9) is provided, wherein the non-thermal process comprises mechanical grinding or chemical etching.

According to aspect (11), the method of any one of aspects (1) to (10) is provided, wherein the glass-based article is substantially free of warp.

According to aspect (12), the method of any one of aspects (1) to (11) is provided, wherein the $t_b$ is in the range of from greater than or equal to 0.3 mm to less than or equal to 5 mm, and the $t_2$ is in the range of greater than or equal to 0.025 mm to less than or equal to 2.5 mm.

According to aspect (13), the method of any one of aspects (1) to (12) is provided, wherein the ion exchange strengthening comprises forming a stress profile in the glass-based article that comprises one or more of the following features: a depth of compression (DOC) that is greater than or equal to $0.11 \cdot t_b$; and a stored tensile energy of 20 J/m² or greater.

According to aspect (14), the method of any one of aspects (1) to (13) is provided, wherein the $t_b$ is less than or equal to 5 mm.

According to aspect (15), the method of any one of aspects (1) to (14) is provided, wherein the warp comprises one or more measurements of magnitude and direction, and the molding surface comprises one or more features that offset the one or more measurements of magnitude and direction of the warp.

According to aspect (16), the method of any one of aspects (1) to (15) is provided, wherein the glass-based article produced in step (IV) is for a portable electronic device.

According to aspect (17), a glass-based article is provided. The glass-based article is formed by the method of any one of aspects (1) to (16).

According to aspect (18), a consumer electronic product is provided. The consumer electronic product comprises: a housing having a front surface, a back surface, and side surfaces; electrical components provided at least partially within the housing, the electrical components including at least a controller, a memory, and a display, the display being provided at or adjacent the front surface of the housing; and a cover disposed over the display; wherein at least a portion of at least one of the housing and the cover comprises the glass-based article according to aspect (17).

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 3 illustrates a glass-based article according to an embodiment;

FIG. 4 illustrates a pocket of the article of FIG. 3;

FIG. 5 illustrates a cross-section of the pocket of FIG. 4;

DETAILED DESCRIPTION

Figure 1:
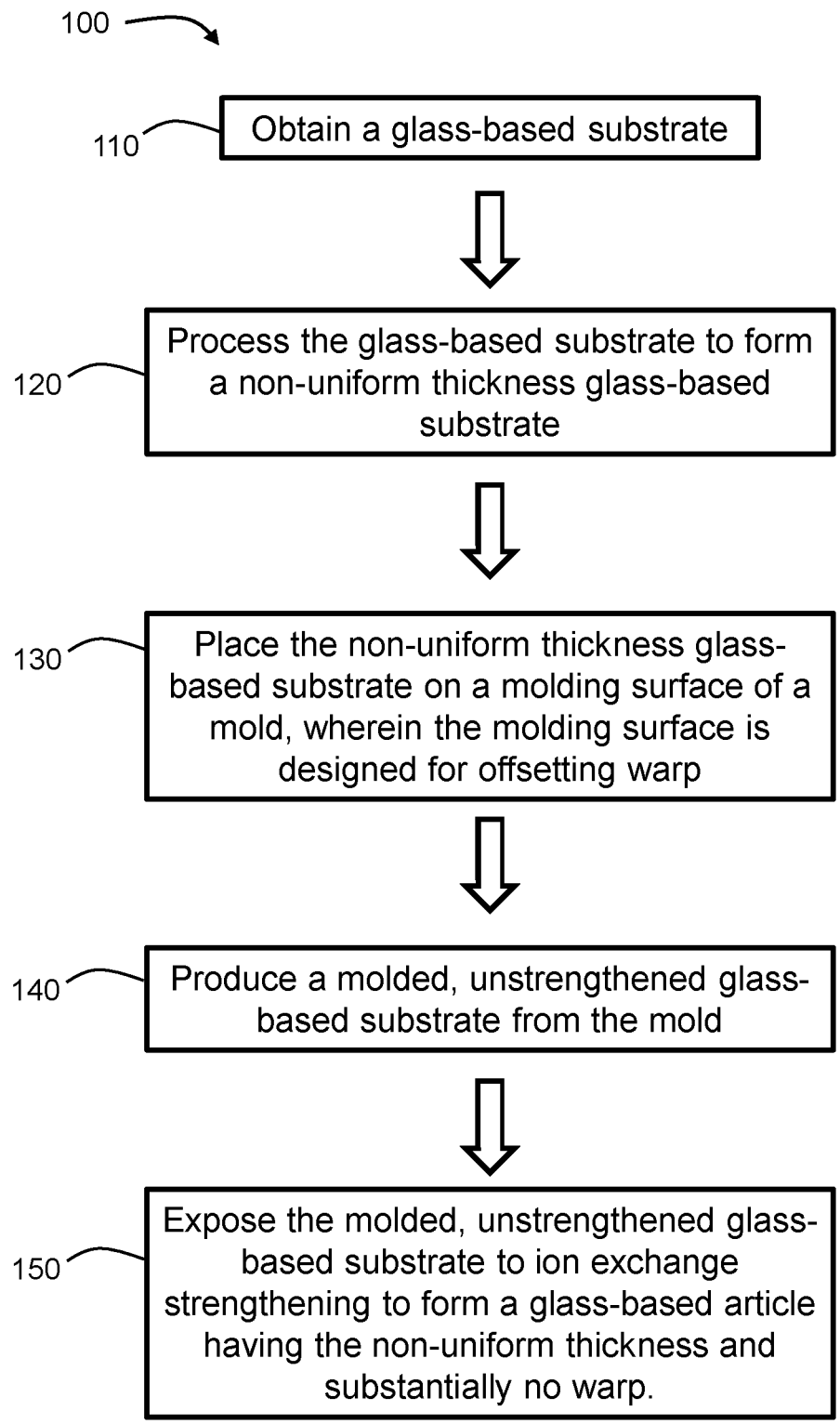
FIG. 1 provides a process flow diagram for a method according to an embodiment.

Before describing several exemplary embodiments, it is to be understood that the disclosure is not limited to the details of construction or process steps set forth in the following disclosure. The disclosure provided herein is capable of other embodiments and of being practiced or being carried out in various ways.

Reference throughout this specification to "one embodiment," "certain embodiments," "various embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in various embodiments," "in one embodiment" or "in an embodiment" in various places throughout this specification are not necessarily referring to the same embodiment, or to only one embodiment. Furthermore, the particular features, structures, materials, or characteristics may be combined in any suitable manner in one or more embodiments.

Definitions and Measurement Techniques

The terms "glass-based article" and "glass-based substrates" are used to include any object made wholly or partly of glass, including glass-ceramics (including an amorphous phase and a crystalline phase). Laminated glass-based articles include laminates of glass and non-glass materials, laminates of glass and crystalline materials. Glass-based substrates according to one or more embodiments can be selected from soda-lime silicate glass, alkali-alumino silicate glass, alkali-containing borosilicate glass, alkali-containing aluminoborosilicate glass, and alkali-containing glass-ceramics.

A "base composition" is a chemical make-up of a substrate prior to any ion exchange (IOX) treatment. That is, the base composition is undoped by any ions from IOX. A composition at the center of a glass-based article that has been IOX treated is typically the same as the base composition when IOX treatment conditions are such that ions supplied for IOX do not diffuse into the center of the substrate. In one or more embodiments, a central composition at the center of the glass article comprises the base composition.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, for example, a glass-based article that is "substantially free of MgO" is one in which MgO is not actively added or batched into the glass-based article, but may be present in very small amounts as a contaminant. As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

Unless otherwise specified, all compositions described herein are expressed in terms of mole percent (mol %) on an oxide basis.

As used herein, 2D substrates or articles have a first major surface and an opposing second major surface wherein the first and second major surfaces are substantially parallel. As used herein, 3D substrates or articles have curvature in both major surfaces, for example at one or more edges of the substrate or article. As used herein 2.5D substrates or articles have curvature in only one of the two major surfaces, for example beveling at one or more edges of the substrate or article.

As used herein, measurement conducted empirically refers to measured and/or analyzed results from physical experiments.

As used herein, measurement conducted by modeling refers to predicted results from an algorithm or other computer-generated method.

A "stress profile" is stress as a function of depth across a thickness of a glass-based article. A compressive stress region extends from a first surface to a depth of compression (DOC) of the article, and is under compressive stress. A central tension region extends from the DOC to include the region where the article is under tensile stress.

As used herein, depth of compression (DOC) refers to the depth at which the stress within the glass-based article changes from compressive to tensile stress. At the DOC, the stress crosses from a positive (compressive) stress to a negative (tensile) stress and thus exhibits a stress value of zero. According to the convention normally used in mechanical arts, compression is expressed as a negative (<0) stress and tension is expressed as a positive (>0) stress. Throughout this description, however, positive values of stress are compressive stress (CS), which are expressed as a positive or absolute value—i.e., as recited herein, CS=|CS|. Additionally, negative values of stress are tensile stress. But when used with the term "tensile", stress or central tension (CT) may be expressed as a positive value, i.e., CT=|CT|. Central tension (CT) refers to tensile stress in a central region or a central tension region of the glass-based article. Maximum central tension (maximum CT or $CT_{max}$) may occur in the central tension region nominally at 0.5·t, where t is the article thickness, which allows for variation from exact center of the location of the maximum tensile stress. Peak tension (PT) refers to maximum tension measured, which may or may not be at the center of the article.

A non-zero metal oxide concentration that varies from the first surface to a depth of layer (DOL) with respect to the metal oxide or that varies along at least a substantial portion of the article thickness (t) indicates that a stress has been generated in the article as a result of ion exchange. The variation in metal oxide concentration may be referred to herein as a metal oxide concentration gradient. The metal oxide that is non-zero in concentration and varies from the first surface to a DOL or along a portion of the thickness may be described as generating a stress in the glass-based article. The concentration gradient or variation of metal oxides is created by chemically strengthening a glass-based substrate in which a plurality of first metal ions in the glass-based substrate is exchanged with a plurality of second metal ions.

As used herein, the terms "depth of exchange", "depth of layer" (DOL), "chemical depth of layer", and "depth of chemical layer" may be used interchangeably, describing in general the depth at which ion exchange facilitated by an ion exchange process (IOX) takes place for a particular ion. DOL refers to the depth within a glass-based article (i.e., the distance from a surface of the glass-based article to its interior region) at which an ion of a metal oxide or alkali metal oxide (e.g., the metal ion or alkali metal ion) diffuses into the glass-based article where the concentration of the ion reaches a minimum value, as determined by Glow Discharge—Optical Emission Spectroscopy (GD-OES)). In some embodiments, the DOL is given as the depth of exchange of the slowest-diffusing or largest ion introduced by an ion exchange (IOX) process.

Unless otherwise specified, CT and CS are expressed herein in megaPascals (MPa), thickness is expressed in millimeters, and DOC and DOL are expressed in microns (micrometers).

Compressive stress (including peak CS) are measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety.

The maximum central tension (CT) or peak tension (PT) and stress retention values are measured using a scattered light polariscope (SCALP) technique known in the art. The Refracted near-field (RNF) method or SCALP may be used to measure the stress profile and the depth of compression (DOC). When the RNF method is utilized to measure the stress profile, the maximum CT value provided by SCALP is utilized in the RNF method. In particular, the stress profile measured by RNF is force balanced and calibrated to the maximum CT value provided by a SCALP measurement. The RNF method is described in U.S. Pat. No. 8,854,623, entitled "Systems and methods for measuring a profile characteristic of a glass sample", which is incorporated herein by reference in its entirety. In particular, the RNF method includes placing the glass article adjacent to a reference block, generating a polarization-switched light beam that is switched between orthogonal polarizations at a rate of from 1 Hz to 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal.

Warp may measured by a laser interferometer such as Tropel® FlatMaster®-FM200. Another way to measure warp is to use an optical measurement device such as OGP SmartScope® Quest™ 3000.

Production of Molds

Methods herein compensate for warp typically exhibited by glass-based articles having non-uniform thicknesses as a result of ion exchange (IOX) strengthening. That is, a substrate's shape prior to IOX is designed in such a way that post-IOX, the strengthened glass article is not warped. Warp of an article is a deviation from a desired design or flatness. Warp comprises one or more measurements of magnitude and direction from a surface. Magnitude is a differential of maximum to minimum height on a surface.

Glass-based articles having non-uniform thicknesses include 2.5D articles, which are effective as a cover glass for a portable electronic device and/or as an enclosure for the portable electronic device.

Because glass volume increases during ion exchange, extra surface area on one side of the substrate results in more expansion on that side, forcing the substrate to warp in order to maintain equilibrium. Such post-ion exchange warp can cause the substrate to no longer be within manufacturing specifications, which can lead to costly rework. Longer ion exchange times with higher weight gains can cause extreme amounts of warp, with displacement equal to 100% or more of the part thickness.

The methods herein include producing a molding surface of a mold based on a measurement of warp obtained by a specified ion exchange strengthening of a glass-based substrate of non-uniform thickness, such that the molding surface offsets the warp. Glass-based substrates resulting from the mold can then be exposed to the specified ion exchange strengthening and form glass-based articles that are substantially free of warp.

Advantageously, because ion exchange warp of a specified ion exchange strengthening is repeatable, molds can be made for repeated use in manufacturing by offsetting warp experienced by an originally flat part to the specified ion exchange strengthening.

Methods herein are also advantageous in that extreme amounts of post-ion exchange warp can be offset, such as those induced by very high central tension (CT) glasses where weight gain can be several percent and the warp can be up to, or more than, 100% of thickness. Further, methods herein may be used to enable 'unbreakable' glass concepts that have very high weight gain and high CT (e.g., 300 MPa and above).

Turning to FIG. 1, a method of making a glass-based article having a non-uniform thickness 100 includes the following. At 110, a glass-based substrate is obtained. Glass-based substrates may be obtained from bulk processes including but not limited to: a float process, a fusion draw process, or a slot draw process. At 120, the glass-based substrate is processed to form a non-uniform thickness glass-based substrate. This may be done by, for example, chemical or mechanical techniques to shape or taper an edge of the substrate and/or to create an area of reduced thickness, for example a thumb or finger sensor pocket. At 130, the non-uniform thickness glass-based substrate is placed on a molding surface of a mold, where the molding surface has been designed to offset warp discussed with respect to FIG. 2. Molding conditions are not limited herein and may include desired temperature profiles and heating and cooling cycles. At 140, a molded, unstrengthened glass-based substrate is produced from the mold. At 150, the molded, unstrengthened glass-based substrate is exposed to ion exchange strengthening to form a glass-based article having the non-uniform thickness and substantially no warp.

Figure 2:
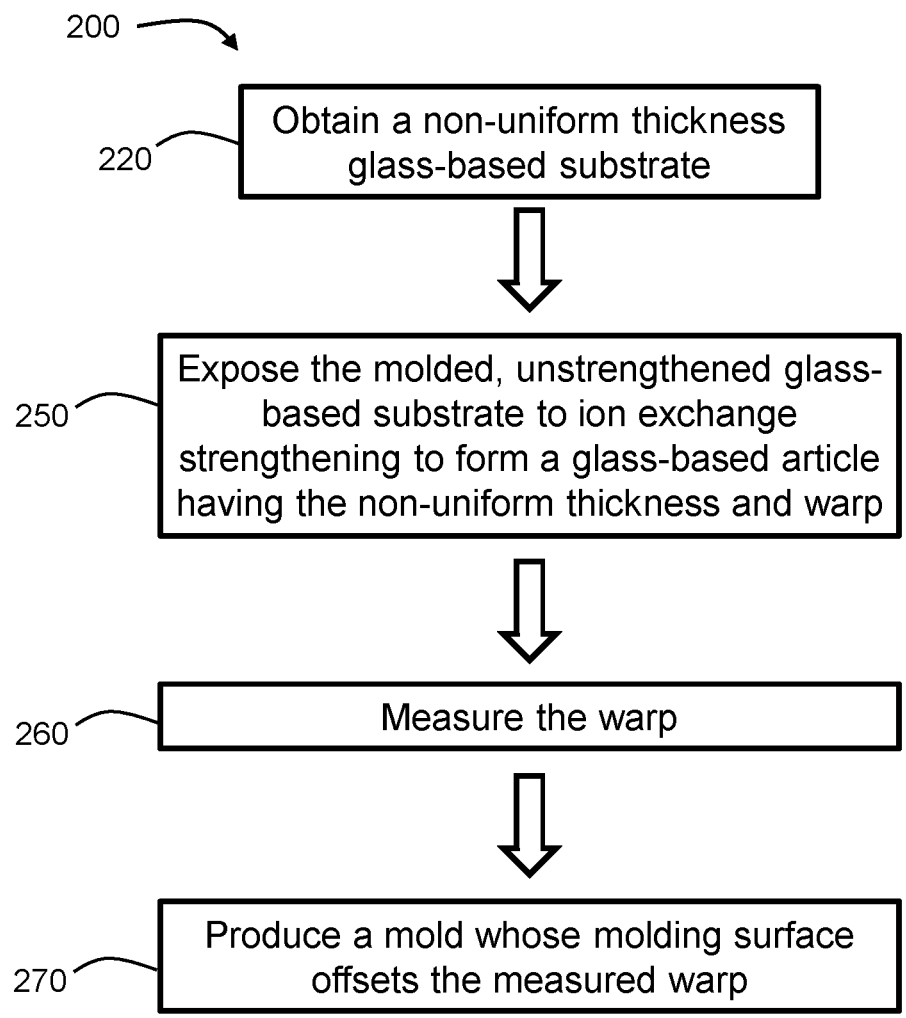
FIG. 2 provides a process flow diagram for a method according to an embodiment.

The molding surface is produced based on a measurement of warp obtained by prior performance of a specified ion exchange strengthening of the non-uniform thickness glass-based substrate of 110 of FIG. 1, which would have the same composition and dimensions as the non-uniform thickness glass-based substrate of 130. In FIG. 2, a method of determining the molding surface 200 includes the following. At 220, a non-uniform thickness glass-based substrate is obtained, which has the same composition and dimensions of the non-uniform thickness glass-based substrate of 120. At 250, the non-uniform glass-based substrate is then exposed to a specified ion exchange treatment, which is the same as the ion exchange strengthening of 150 to form a glass-based article having the non-uniform thickness and warp. At 260, warp is measured. Warp may be measured empirically or by modeling. At 270, a mold is produced whose molding surface is designed to offset the measured warp.

For measurement of warp being conducted empirically, the method of determining the molding surface 200 includes physically obtaining the glass-based substrate, exposing it to ion exchange, measuring warp using equipment such as a laser interferometer or an optical measurement device, and producing a mold whose molding surface off-sets the measured warp.

For measurement of warp being conducted by modeling, the method of determining the molding surface 200 includes entering physical parameters of obtaining the glass-based substrate into a computer model or algorithm, inputting ion exchange parameters into the model, running the model to predict warp using theoretical equations relating stress in a glass to a diffused ion concentration, and producing a mold whose molding surface off-sets the predicted warp.

Glass-Based Substrates and Processing to Form Non-Uniform Thicknesses

Examples of glasses that may be used as substrates may include alkali-alumino silicate glass compositions or alkali-containing aluminoborosilicate glass compositions, though other glass compositions are contemplated. Specific examples of glass-based substrates that may be used include but are not limited to an alkali-alumino silicate glass, an alkali-containing borosilicate glass, an alkali-alumino borosilicate glass, an alkali-containing lithium alumino silicate glass, or an alkali-containing phosphate glass. The glass-based substrates have base compositions that may be characterized as ion exchangeable. As used herein, "ion exchangeable" means that a substrate comprising the composition is capable of exchanging cations located at or near the surface of the substrate with cations of the same valence that are either larger or smaller in size.

In one or more embodiments, the glass-based substrates may include a lithium-containing aluminosilicate.

In embodiments, the glass-based substrates may be formed from any composition capable of forming the stress profiles. In some embodiments, the glass-based substrates may be formed from the glass compositions described in U.S. application Ser. No. 16/202,691 titled "Glasses with Low Excess Modifier Content," filed Nov. 28, 2018 which claims priority to U.S. Provisional Application No. 62/591,953 titled "Glasses with Low Excess Modifier Content," filed Nov. 29, 2017, the entirety of each of which is incorporated herein by reference. In some embodiments, the glass articles may be formed from the glass compositions described in U.S. application Ser. No. 16/202,767 titled "Ion-Exchangeable Mixed Alkali Aluminosilicate Glasses," filed Nov. 28, 2018 which claims priority to U.S. Provisional Application No. 62/591,958 titled "Ion-Exchangeable Mixed Alkali Aluminosilicate Glasses," filed Nov. 29, 2017, the entirety of each of which is incorporated herein by reference.

The glass-based substrates may be characterized by the manner in which it they are formed. For instance, the glass-based substrates may be characterized as float-formable (i.e., formed by a float process), down-drawable and, in particular, fusion-formable or slot-drawable (i.e., formed by a down draw process such as a fusion draw process or a slot draw process).

Some embodiments of the glass-based substrates described herein may be formed by a down-draw process. Down-draw processes produce glass-based substrates having a uniform thickness that possess relatively pristine surfaces. Because the average flexural strength of the glass article is controlled by the amount and size of surface flaws, a pristine surface that has had minimal contact has a higher initial strength. In addition, down drawn glass articles have a very flat, smooth surface that can be used in its final application without costly grinding and polishing.

Some embodiments of the glass-based substrates may be described as fusion-formable (i.e., formable using a fusion draw process). The fusion process uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass article. The fusion draw method offers the advantage that, because the two glass films flowing over the channel fuse together, neither of the outside surfaces of the resulting glass article comes in contact with any part of the apparatus. Thus, the surface properties of the fusion drawn glass article are not affected by such contact.

Some embodiments of the glass-based substrates described herein may be formed by a slot draw process. The slot draw process is distinct from the fusion draw method. In slot draw processes, the molten raw material glass is provided to a drawing tank. The bottom of the drawing tank has an open slot with a nozzle that extends the length of the slot. The molten glass flows through the slot/nozzle and is drawn downward as a continuous glass article and into an annealing region.

In one or more embodiments, the glass-based substrates described herein may exhibit an amorphous microstructure and may be substantially free of crystals or crystallites. In other words, the glass-base substrates articles exclude glass-ceramic materials in some embodiments.

Processing to form non-uniform thickness glass-based substrates includes but is not limited to thermal forming and non-thermal forming processes. Non-thermal processes for forming tapered edge profiles include but are not limited to mechanical grinding (notwithstanding any nominal heat generation occurring during mechanical grinding) or chemical etching.

In an embodiment, a substrate of non-uniform thickness comprises: a secondary portion bordering a body portion and having a tapered profile, the secondary thickness ($t_2$) being located at a perimeter edge of the glass-based substrate and the secondary thickness ($t_2$) is less than the body thickness ($t_b$). Glass-based articles formed therefrom have a 2.5-dimensional shape. In an embodiment, the secondary portion is off-set from one or more perimeter edges of the glass-based substrate, and the secondary thickness ($t_2$) is less than the body thickness ($t_b$). The $t_b$ may be in the range of from greater than or equal to 0.3 mm to less than or equal to 5 mm, and the $t_2$ may be in the range of greater than or equal to 0.025 mm to less than or equal to 2.5 mm, and all values and sub-ranges therebetween.

Ion Exchange (IOX) Treatment

Chemical strengthening of glass substrates having base compositions is done by placing the ion-exchangeable glass substrates in a molten bath containing cations (e.g., K+, Na+, Ag+, etc) that diffuse into the glass while the smaller alkali ions (e.g., Na+, Li+) of the glass diffuse out into the molten bath. The replacement of the smaller cations by larger ones creates compressive stresses near the surface of glass. Tensile stresses are generated in the interior of the glass to balance the near-surface compressive stresses.

With respect to ion exchange processes, they may independently be a thermal-diffusion process or an electro-diffusion process. Non-limiting examples of ion exchange processes in which glass is immersed in multiple ion exchange baths, with washing and/or annealing steps between immersions, are described in U.S. Pat. No. 8,561,429, by Douglas C. Allan et al., issued on Oct. 22, 2013, entitled "Glass with Compressive Surface for Consumer Applications," and claiming priority from U.S. Provisional Patent Application No. 61/079,995, filed Jul. 11, 2008, in which glass is strengthened by immersion in multiple, successive, ion exchange treatments in salt baths of different concentrations; and U.S. Pat. No. 8,312,739, by Christopher M. Lee et al., issued on Nov. 20, 2012, and entitled "Dual Stage Ion Exchange for Chemical Strengthening of Glass," and claiming priority from U.S. Provisional Patent Application No. 61/084,398, filed Jul. 29, 2008, in which glass is strengthened by ion exchange in a first bath diluted with an effluent ion, followed by immersion in a second bath having a smaller concentration of the effluent ion than the first bath. The contents of U.S. Pat. Nos. 8,561,429 and 8,312,739 are incorporated herein by reference in their entireties.

After an ion exchange process is performed, it should be understood that a composition at the surface of a glass article may be different than the composition of the as-formed glass article (i.e., the glass article before it undergoes an ion exchange process). This results from one type of alkali metal ion in the as-formed glass, such as, for example $Li^+$ or $Na^+$, being replaced with larger alkali metal ions, such as, for example $Na^+$ or $K^+$, respectively. However, the glass composition at or near the center of the depth of the glass article will, in embodiments, still have the composition of the as-formed glass article.

Glass-Based Articles

Glass-based articles herein have non-uniform thicknesses and are substantially free of warp. As utilized herein, substantially free of warp refers to a displacement values of less than or equal to ±10 micrometers. Glass-based articles having non-uniform thicknesses include 2.5D articles, which are effective as a cover glass for a portable electronic device and/or as an enclosure for the portable electronic device.

With specific regard to glass-based articles having sections of different thicknesses, the following patent application is incorporated herein by reference in its entirety: U.S. application Ser. No. 16/150,816 titled "Class-based Articles with Sections of Different Thicknesses," filed Oct. 3, 2018.

FIG. 3 illustrates a glass-based article 300 having a non-uniform thickness away from the edges. Body portion 302, which is a first section, has a body thickness ($t_b$) and a first central tension ($CT_1$). Line 314 designates a midline of the article 300. Secondary portion 304, which is a second section, has a secondary thickness ($t_2$) and a second central tension ($CT_2$). Generally, the difference between $t_b$ and $t_2$ is at least 100 microns. In one or more embodiments, the $t_b$ is greater than the $t_2$ by at least 100 microns. The $t_2$ may be in the range of $0.05 \cdot t_b$ to $0.96 \cdot t_b$. In one or more embodiments, the $t_2$ is reduced by about 20% relative to $t_b$, or by about 30%, about 40%, about 50%, about 60%, about 70%, about 80%, about 90%, about 95%, and all values and subranges therebetween. The $t_b$ may be in the range of 0.3 mm to 5 mm, and all values and subranges therebetween; and the $t_2$ may be in the range of 0.025 mm to 2.5 mm, and all values and subranges therebetween. $CT_2$ is less than the $CT_1$, which is advantageous for ensuring the second section is not frangible despite having been ion exchanged under the same conditions as the first section. While the figures depict a single section having a thickness different from the rest of the article, it is noted that there may be multiple sections or pockets of different depths in the same article.

In this embodiment, the second section 304 is off-set from all edges 306, 308, 310, and 312 of the article 300. That is, second section 304 does not intersect any of the edges 306, 308, 310, 212.

FIG. 4 illustrates the second section 304 being defined by sides 316, 318, 320, and 322. In this embodiment, the second section 304 is a thin pocket designed to accommodate a fingerprint sensor or the like. Line 324 designates a centerline of the second section 304. FIG. 5 illustrates a cross-section of the article 300 along line 324 of FIG. 4. Sides 316, 318, 320, and 322 provide a transition from a body 305 of the second section 304 to the first section 302.

Figures 6A, 6B:
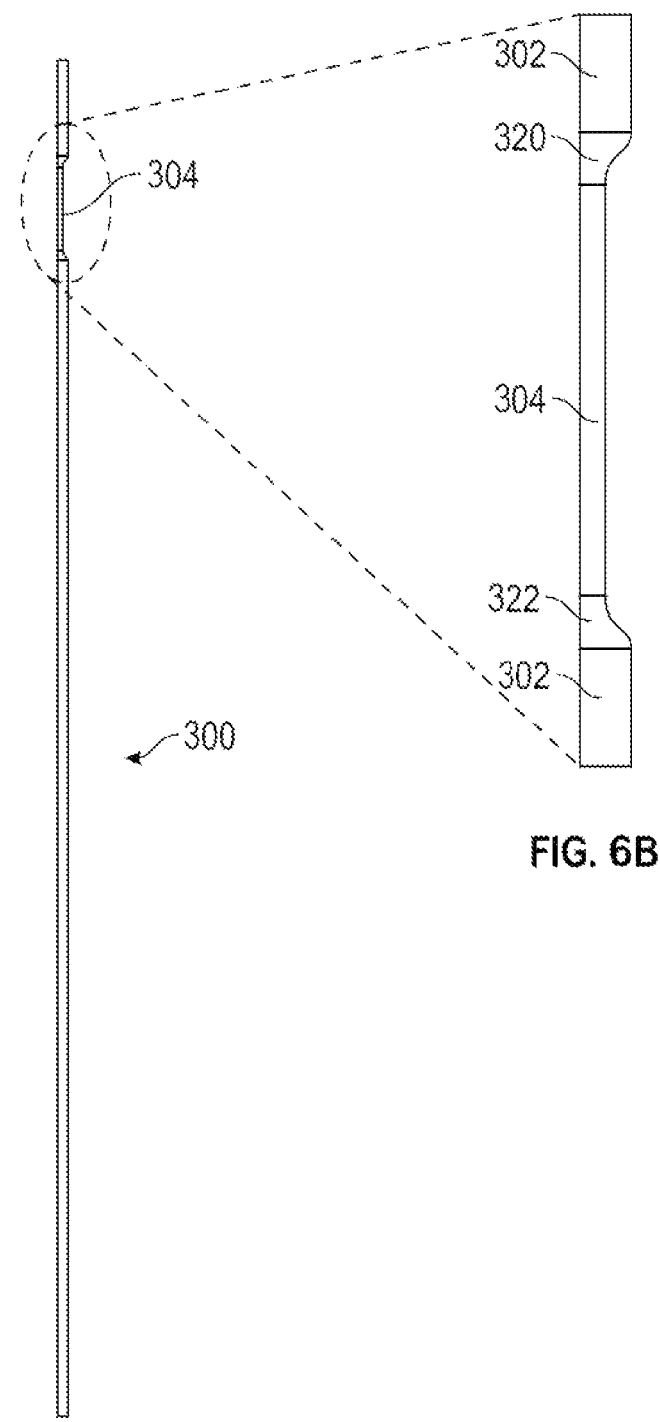
FIG. 6A illustrates a cross-section of the article of FIG. 3.
FIG. 6B illustrates a close-up cross-section of a portion of the article of FIG. 3 with a different thickness.

FIG. 6A illustrates a cross-section of the article 300 along midline 314 of FIG. 1 and the location of second section 304. FIG. 6B illustrates a close-up of the cross-section of the second section 304 having sides 320 and 322 which transition to the first section 302.

Figure 7:
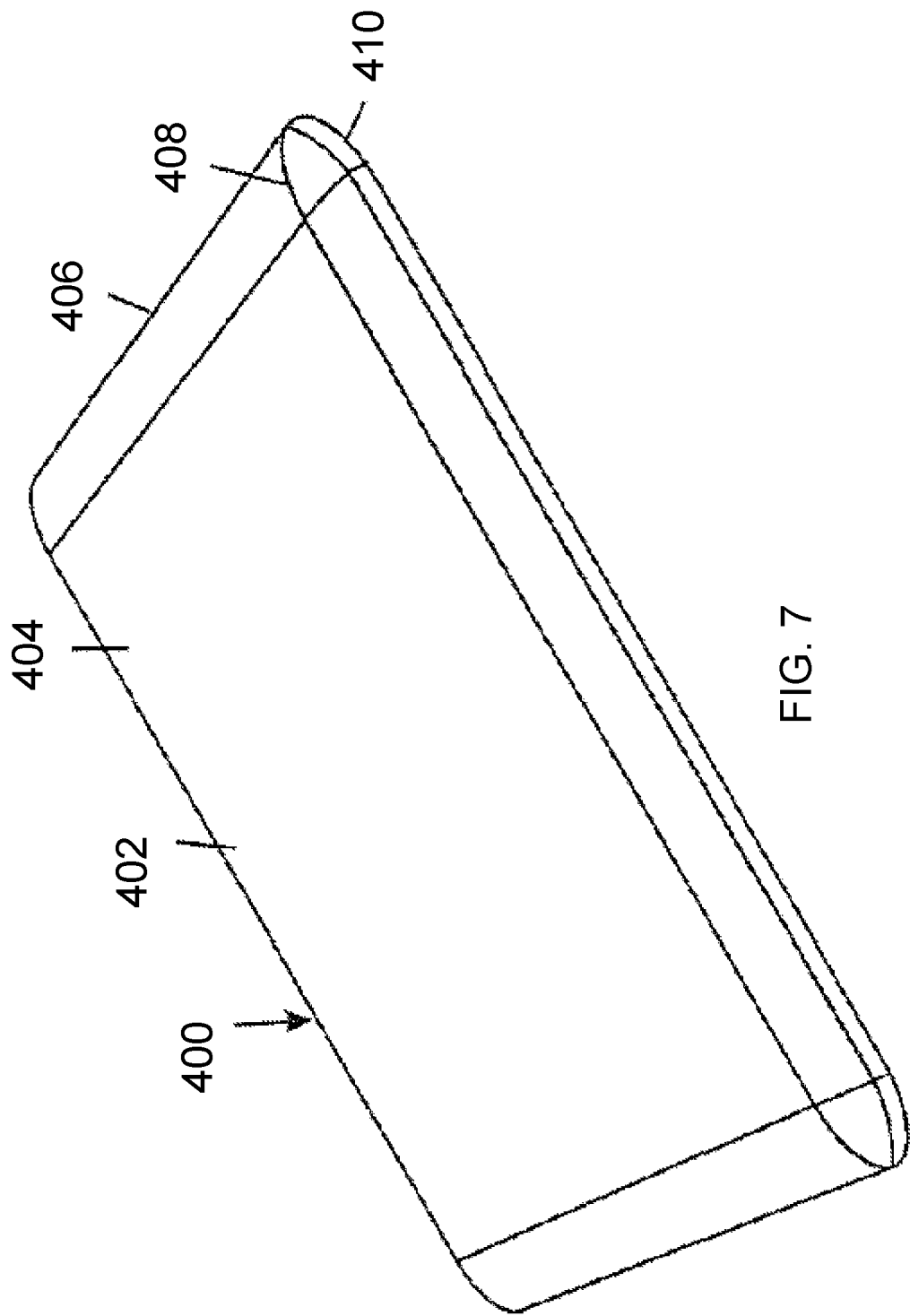
FIG. 7 illustrates a glass-based article according to an embodiment.

FIG. 7 illustrates a glass-based article 400 according to certain embodiments. The glass-based article 400 includes a cover glass 402 having an upper surface 404, a lower surface (not shown) opposite to the upper surface 404, and an edge 406 connecting the upper surface 404 to the lower surface. The edge 406 connects to the upper surface 404 with a first tapered edge 408, and to the lower surface with a second tapered edge 410. In some 2.5D articles, there is only one tapered edge.

The glass-based articles may have stress profiles that comprise one or more of the following features: a depth of compression (DOC) that is greater than or equal to $0.11 \cdot t_b$; and/or a stored tensile energy of 20 $J/m^2$ or greater. The glass-based articles may have a to less than or equal to 5 mm.

In the glass-based articles, there is an alkali metal oxide having a non-zero concentration that varies from one or both of first and second surfaces to a depth of layer (DOL) with respect to the metal oxide. A stress profile is generated due to the non-zero concentration of the metal oxide(s) that varies from the first surface. The non-zero concentration may vary along a portion of the article thickness. In some embodiments, the concentration of the alkali metal oxide is non-zero and varies, both along a thickness range from about $0 \cdot t$ to about $0.3 \cdot t$. In some embodiments, the concentration of the alkali metal oxide is non-zero and varies along a thickness range from about $0 \cdot t$ to about $0.35 \cdot t$, from about $0 \cdot t$ to about $0.4 \cdot t$, from about $0 \cdot t$ to about $0.45 \cdot t$, from about $0 \cdot t$ to about $0.48 \cdot t$, or from about $0 \cdot t$ to about $0.50 \cdot t$. The variation in concentration may be continuous along the above-referenced thickness ranges. Variation in concentration may include a change in metal oxide concentration of about 0.2 mol % or more along a thickness segment of about 100 micrometers. The change in metal oxide concentration may be about 0.3 mol % or more, about 0.4 mol % or more, or about 0.5 mol % or more along a thickness segment of about 100 micrometers. This change may be measured by known methods in the art, including microprobe.

In some embodiments, the variation in concentration may be continuous along thickness segments in the range from about 10 micrometers to about 30 micrometers. In some embodiments, the concentration of the alkali metal oxide decreases from the first surface to a value between the first surface and the second surface and increases from the value to the second surface.

The concentration of alkali metal oxide may include more than one metal oxide (e.g., a combination of $Na_2O$ and $K_2O$). In some embodiments, where two metal oxides are utilized and where the radius of the ions differ from one or another, the concentration of ions having a larger radius is greater than the concentration of ions having a smaller radius at shallow depths, while at deeper depths, the concentration of ions having a smaller radius is greater than the concentration of ions having larger radius.

In one or more embodiments, the alkali metal oxide concentration gradient extends through a substantial portion of the thickness t of the article. In some embodiments, the concentration of the metal oxide may be about 0.5 mol % or greater (e.g., about 1 mol % or greater) along the entire thickness of the first and/or second section, and is greatest at a first surface and/or a second surface $0 \cdot t$ and decreases substantially constantly to a value between the first and second surfaces. At that value, the concentration of the metal oxide is the least along the entire thickness t; however the concentration is also non-zero at that point. In other words, the non-zero concentration of that particular metal oxide extends along a substantial portion of the thickness t (as described herein) or the entire thickness t. The total concentration of the particular metal oxide in the glass-based article may be in the range from about 1 mol % to about 20 mol %.

The concentration of the alkali metal oxide may be determined from a baseline amount of the metal oxide in the glass-based substrate ion exchanged to form the glass-based article.

End Products

Figure 8A:
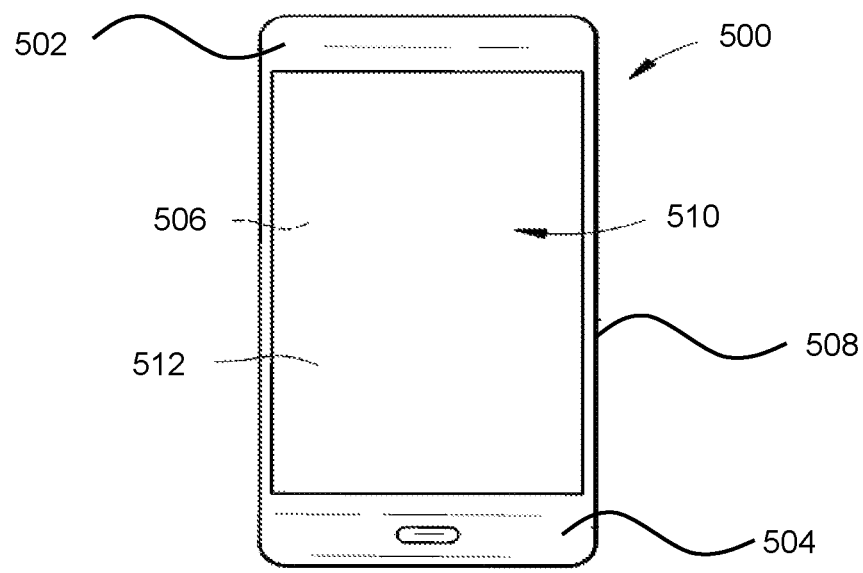
FIG. 8A is a plan view of an exemplary electronic device incorporating any of the glass articles disclosed herein.
Figure 8B:
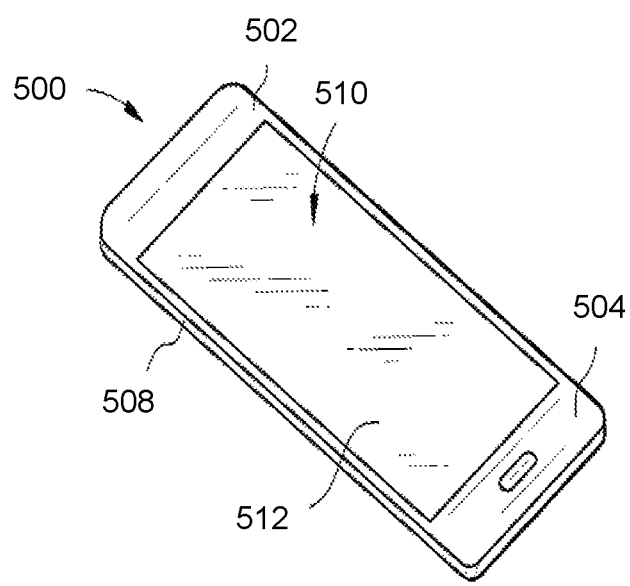
FIG. 8B is a perspective view of the exemplary electronic device of FIG. 8A.

The glass-based articles disclosed herein may be incorporated into another article such as an article with a display (or display articles) (e.g., consumer electronics, including mobile phones, tablets, computers, navigation systems, and the like), architectural articles, transportation articles (e.g., automobiles, trains, aircraft, sea craft, etc.), appliance articles, or any article that requires some transparency, scratch-resistance, abrasion resistance or a combination thereof. An exemplary article incorporating any of the glass articles disclosed herein is shown in FIGS. 8A and 8B. Specifically, FIGS. 8A and 8B show a consumer electronic device 500 including a housing 502 having front 504, back 506, and side surfaces 508; electrical components (not shown) that are at least partially inside or entirely within the housing and including at least a controller, a memory, and a display 510 at or adjacent to the front surface of the housing; and a cover substrate 512 at or over the front surface of the housing such that it is over the display. In some embodiments, the cover substrate 512 may include any of the glass articles disclosed herein.

EXAMPLES

Embodiments will be further clarified by the following example. It should be understood that these examples are not limiting to the embodiments described above.

Example 1—Modeling

A glass-based substrate having a 2.5D edge, whose physical parameters were input into a computer model was exposed to the following simulated ion exchange conditions: 60 hours with 0.2 weight percent $NaNO_3$ salt bath at 460° C. to form a glass-based article having a non-uniform thickness and warp according to the steps 220 and 250 of the method of FIG. 2.

Figure 9:
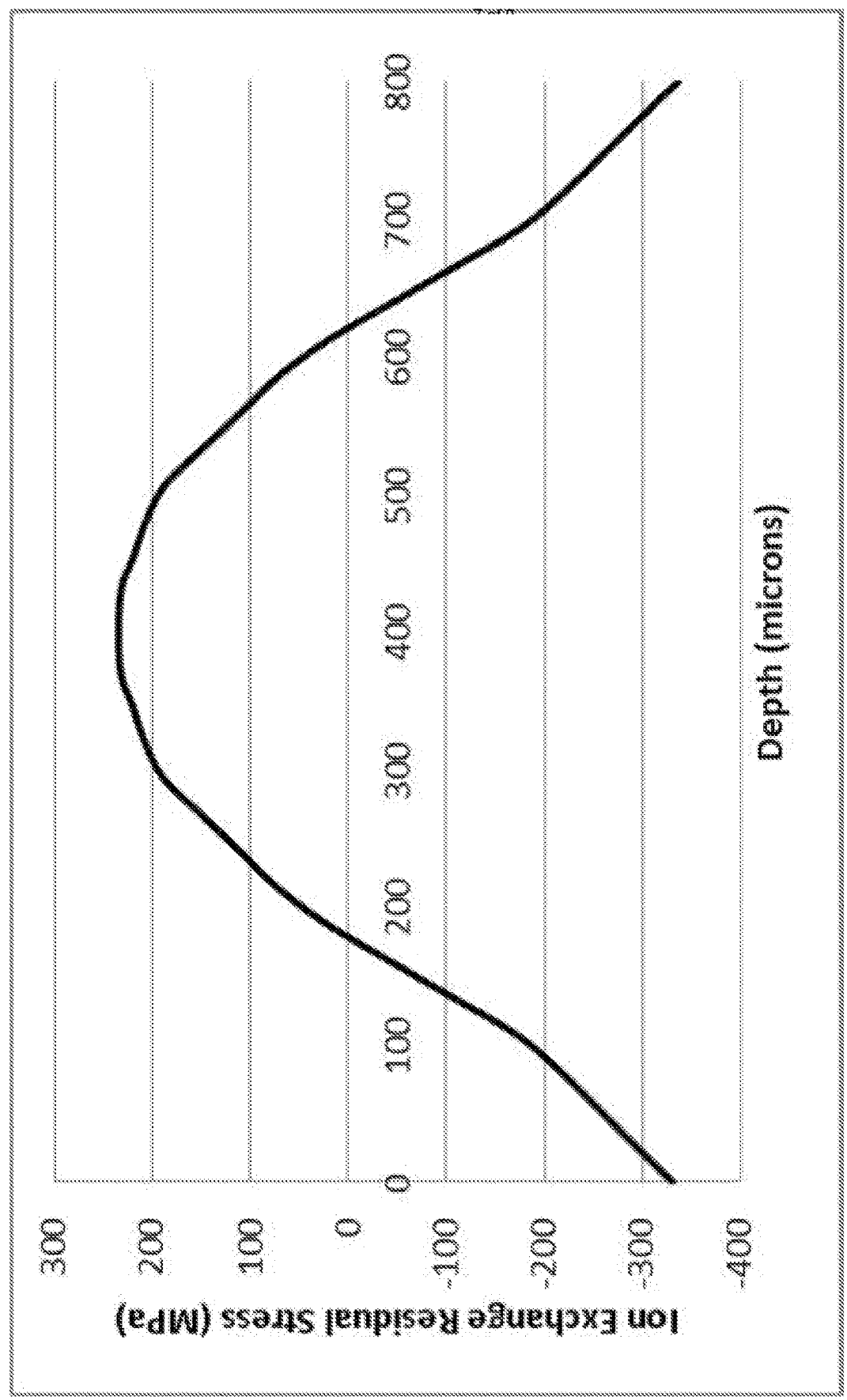
FIG. 9 is a graph of ion exchange residual stress (MPa) versus depth (microns) for an embodiment of the method of FIG. 2.

The residual stress profile through the thickness resulting from the ion exchange at a location far from the edges is shown in FIG. 9. The ion exchange stresses were modelled using a thermal analog, where ion concentration was modelled by a temperature analog and every thermal component had a concentration analog. The ion exchange process was first simulated via a thermal model, the results of which were then input into a structural model as a predefined field and a three-dimensional structural response was calculated based on a network dilation coefficient (analogous to the coefficient of thermal expansion).

Figure 10:
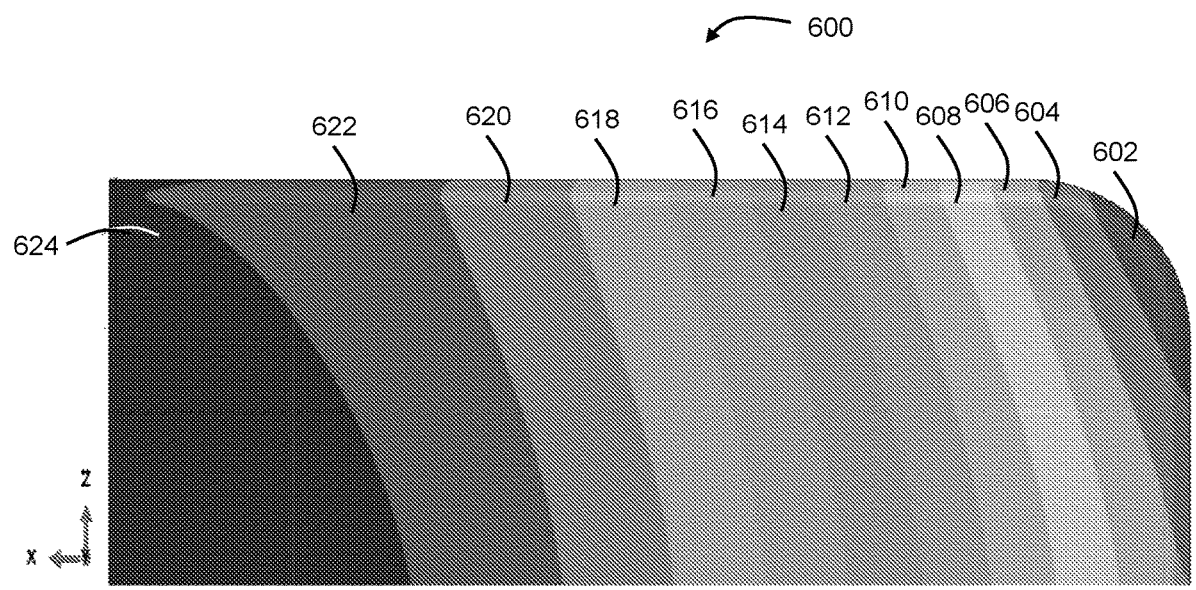
FIG. 10 is a contour plot for the embodiment according to the steps 220 and 250 of the method of FIG. 2.

In accordance with FIG. 2, step 260, measured warp as predicted by the model is shown in a contour plot of FIG. 10. In FIG. 10, the contour plot for a portion of the warped glass-based article 600 is provided where each section corresponds to a different displacement in micrometers as follows:

section 602 is from +2.010e+02 to +1.765e+02;
section 604 is from +1.765e+02 to +1.521e+02;
section 606 is from +1.521e+02 to +1.276e+02;
section 608 is from +1.276e+02 to +1.031e+02;
section 610 is from +1.031e+02 to +7.861e+01;
section 612 is from +7.861e+01 to +5.413e+01;
section 614 is from +5.413e+01 to +2.964e+01;
section 616 is from +2.964e+01 to +5.159e+00;
section 618 is from +5.159e+00 to −1.993e+01;
section 620 is from −1.993e+01 to −4.391e+01;
section 622 is from −4.391e+01 to −6.829e+01; and
section 624 is from −6.829e+01 to −9.279e+01.

Figure 11:
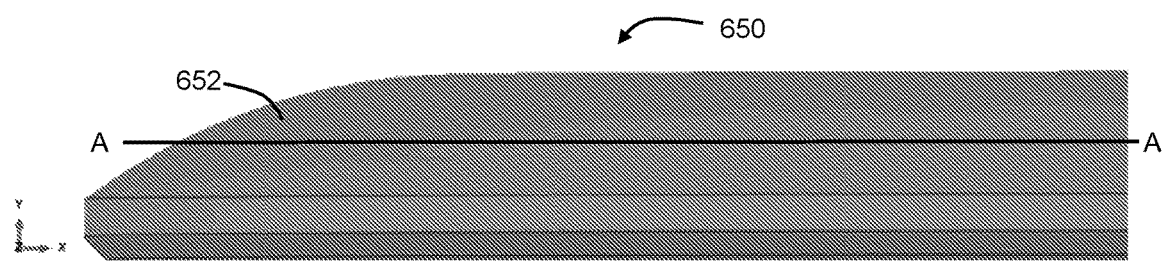
FIG. 11 is a contour plot for the embodiment according to the method of FIG. 1.

Next, in accordance with step 270 of FIG. 2, a warp-compensated mold was designed to offset the warp predicted by FIG. 10 and its parameters were entered into the computer model. FIG. 11 shows a contour plot for a portion of the modelled IOX's glass-based article in accordance with the method of FIG. 1 resulting from a warp-compensated mold 650 having substantially no warp. That is, the glass-based article had only one level of displacement measurement: section 652 is from +2.010e+02 to +1.765e+02 micrometers.

Figure 12:
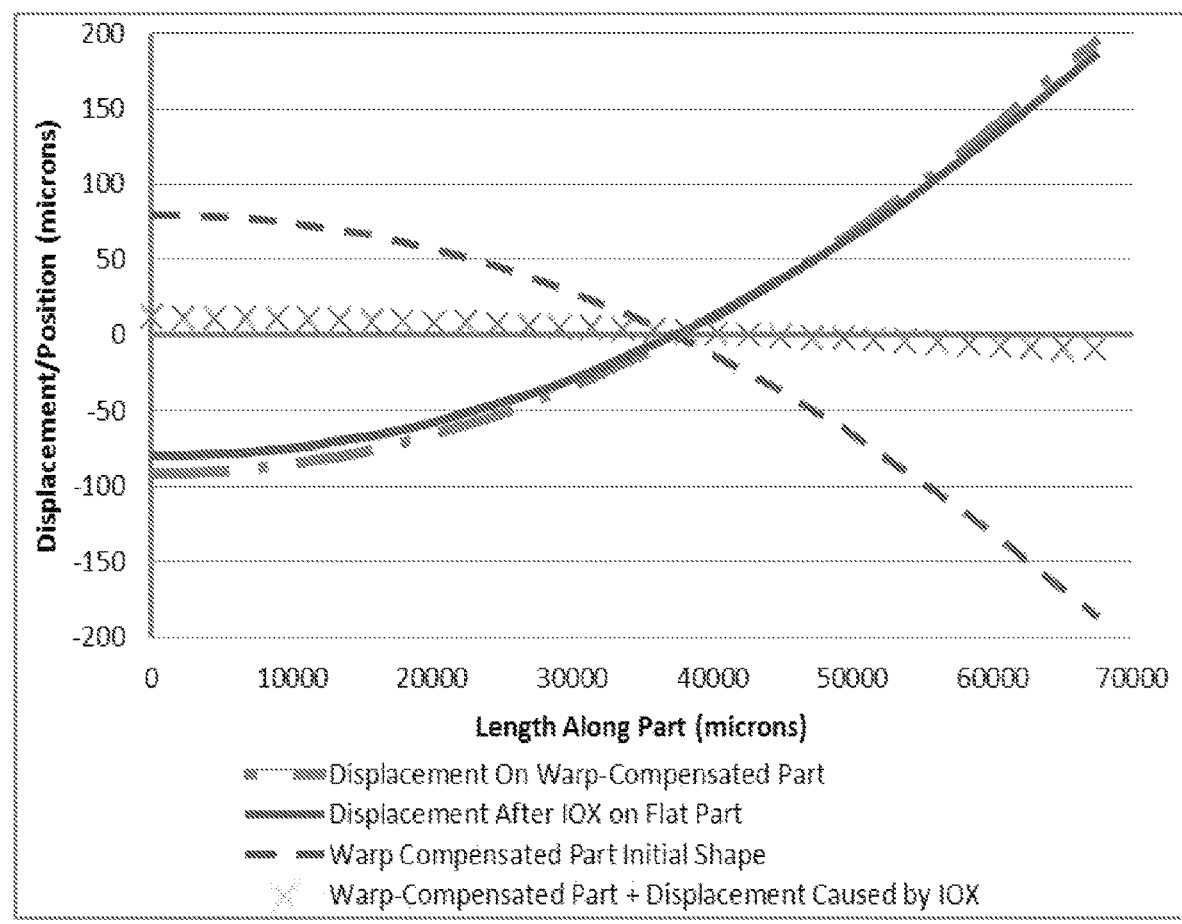
FIG. 12 is a graph of displacement (micrometers) versus position on the surface of glass-based articles.

FIG. 12 is a graph of displacement (micrometers) versus position on the surface of the articles modeled, for example along line A-A of FIG. 11 for the warp-compensated article. The warp-compensated article showed a displacement on the order of a few micrometers, whereas the warped article (600 of FIG. 10) showed a displacement on the order of about 300 micrometers.

All compositional components, relationships, and ratios described in this specification are provided in mol % unless otherwise stated. All ranges disclosed in this specification include any and all ranges and subranges encompassed by the broadly disclosed ranges whether or not explicitly stated before or after a range is disclosed.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method of making a glass-based article having a non-uniform thickness, comprising:
    (I) processing a glass-based substrate to form a non-uniform thickness glass-based substrate comprising a body portion having a body thickness ($t_b$) and a secondary portion having a secondary thickness ($t_2$);
    (II) placing the non-uniform thickness glass-based substrate on a molding surface of a mold;
    (III) producing a molded, unstrengthened glass-based substrate from the mold of step (II); and
    (IV) ion exchange strengthening the molded, unstrengthened glass-based substrate produced in step (III) to form the glass-based article having the non-uniform thickness;
    wherein the molding surface of the mold of step (II) is produced based on a measurement of warp obtained by prior performance of the ion exchange strengthening of step (IV) on a non-uniform thickness glass-based substrate having the same composition and dimensions as the non-uniform thickness glass-based substrate of (I) such that the molding surface of the mold of step (II) offsets the ion exchange strengthening induced warp; and
    wherein the secondary portion is off-set from one or more perimeter edges of the glass-based substrate, and the secondary thickness ($t_2$) is less than the body thickness ($t_b$).

2. The method of claim 1, wherein the measurement of warp is conducted empirically.

3. The method of claim 1, wherein the measurement of warp is conducted by modeling.

4. The method of claim 1, wherein the glass-based article is substantially free of warp.

5. The method of claim 1, wherein the $t_b$ is in the range of from greater than or equal to 0.3 mm to less than or equal to 5 mm, and the $t_2$ is in the range of greater than or equal to 0.025 mm to less than or equal to 2.5 mm.

6. The method of claim 1, wherein the ion exchange strengthening comprises forming a stress profile in the glass-based article that comprises one or more of the following features:
    a depth of compression (DOC) that is greater than or equal to $0.11 \cdot t_b$; and
    a stored tensile energy of 20 J/m$^2$ or greater.

7. The method of claim 1, wherein the $t_b$ is less than or equal to 5 mm.

8. The method of claim 1, wherein the warp comprises one or more measurements of magnitude and direction, and the molding surface comprises one or more features that offset the one or more measurements of magnitude and direction of the warp.

9. The method of claim 1, wherein the glass-based article produced in step (IV) is for a portable electronic device.

10. A method of making a glass-based article with 2.5 dimensionality, the method comprising:
    (I) processing a glass-based substrate to form a tapered edge profile glass-based substrate comprising a body portion having a body thickness ($t_b$), a secondary portion having a secondary thickness, and a perimeter portion which: (i) borders at least part of a planar central portion of the tapered edge profile glass-based substrate; (ii) has a thickness that decreases from the body portion to a perimeter edge having a thickness ($t_2$), wherein $t_b > t_2$; and (iii) is within the plane of the body portion;
    (II) placing the tapered edge profile glass-based substrate on a molding surface of a mold;
    (III) producing a molded, unstrengthened glass-based substrate from the mold of step (II); and
    (IV) ion exchange strengthening the molded, unstrengthened glass-based substrate produced in step (III) to form the glass-based article with 2.5-dimensionality;
    wherein the molding surface of the mold of step (II) is produced based on a measurement of warp obtained by prior performance of the ion exchange strengthening of step (IV) on a tapered edge profile glass-based substrate having the same composition and dimensions as the tapered edge profile glass-based substrate of (I) such that the molding surface of the mold of step (II) offsets the ion exchange strengthening induced warp; and
    wherein the secondary portion is off-set from one or more perimeter edges of the tapered edge profile glass-based substrate, and the secondary thickness is less than the body thickness ($t_b$).

11. The method of claim 10, wherein the measurement of warp is conducted empirically.

12. The method of claim 10, wherein the measurement of warp is conducted by modeling.

13. The method of claim 10, wherein the processing of the glass-based substrate to form the perimeter portion of the tapered edge profile glass-based substrate comprises a non-thermal process.

14. The method of claim 13, wherein the non-thermal process comprises mechanical grinding or chemical etching.

15. The method of claim 10, wherein the glass-based article is substantially free of warp.

16. The method of claim 10, wherein the $t_b$ is in the range of from greater than or equal to 0.3 mm to less than or equal to 5 mm, and the $t_2$ is in the range of greater than or equal to 0.025 mm to less than or equal to 2.5 mm.

17. The method of claim 10, wherein the ion exchange strengthening comprises forming a stress profile in the glass-based article that comprises one or more of the following features:

a depth of compression (DOC) that is greater than or equal to $0.11 \cdot t_b$; and a stored tensile energy of 20 J/m² or greater.

18. The method of claim 10, wherein the $t_b$ is less than or equal to 5 mm.

19. The method of claim 10, wherein the warp comprises one or more measurements of magnitude and direction, and the molding surface comprises one or more features that offset the one or more measurements of magnitude and direction of the warp.

20. The method of claim 10, wherein the glass-based article produced in step (IV) is for a portable electronic device.

\* \* \* \* \*